US012692838B2

(12) United States Patent
Macleay et al.

(10) Patent No.: US 12,692,838 B2
(45) Date of Patent: Jul. 28, 2026

(54) INSTALLING EQUIPMENT IN OFFSHORE MONOPILE FOUNDATIONS

(71) Applicant: Seaway 7 Engineering B.V., Zoetermeer (NL)

(72) Inventors: Alan John Macleay, Aberdeenshire (GB); Nicolas Houdeville, Paris (FR); David John Down, Essex (GB)

(73) Assignee: Seaway 7 Engineering B.V., Zoetermeer (NL)

( * ) Notice: Subject to any disclaimer, the term of this patent is extended or adjusted under 35 U.S.C. 154(b) by 110 days.

(21) Appl. No.: 18/039,710

(22) PCT Filed: Dec. 1, 2021

(86) PCT No.: PCT/GB2021/053136
§ 371 (c)(1),
(2) Date: May 31, 2023

(87) PCT Pub. No.: WO2022/118015
PCT Pub. Date: Jun. 9, 2022

(65) Prior Publication Data
US 2024/0052807 A1      Feb. 15, 2024

(30) Foreign Application Priority Data

Dec. 1, 2020    (GB) ..................................... 2018952

(51) Int. Cl.
*F03D 13/10*          (2016.01)
*F03D 13/20*          (2016.01)
(Continued)

(52) U.S. Cl.
CPC .......... *F03D 13/112* (2023.08); *F03D 13/206* (2023.08); *F03D 13/25* (2016.05);
(Continued)

(58) Field of Classification Search
CPC ...... F03D 13/10; F03D 13/112; F03D 13/206; F03D 13/25; F03D 13/122; F03D 13/135; F03D 80/501; F03D 80/80; F05B 2240/95
See application file for complete search history.

(56) References Cited

U.S. PATENT DOCUMENTS 7,762,037 B2 * 7/2010 Meiners .................. F03D 80/00
                                                           52/223.3
9,494,131 B2    11/2016 Fischer et al.
(Continued)

FOREIGN PATENT DOCUMENTS

DE        102017010650          5/2019
DE        102017010650 A1 *    5/2019
(Continued)

OTHER PUBLICATIONS

Balltec Engineered Solutions (Year: 2020).*

*Primary Examiner* — Nathaniel E Wiehe
*Assistant Examiner* — Art Golik
(74) *Attorney, Agent, or Firm* — Mattingly & Malur, PC

(57)          ABSTRACT

An equipment canister for supporting and enclosing electrical equipment of a wind turbine comprises a housing defining or containing at least one internal platform for supporting the equipment; a lifting interface on a top of the housing; an at least one support formation positioned on or projecting laterally beyond a side wall of the housing. The support formation is capable of supporting the weight of the canister suspended therefrom when the canister is installed within a monopile wind turbine foundation. Various wind turbine arrangements and wind turbine assembly methods incorporating such a canister are also described.

32 Claims, 9 Drawing Sheets

(51) Int. Cl.
| | |
|---|---|
| *F03D 13/25* | (2016.01) |
| *F03D 80/50* | (2016.01) |
| *F03D 80/80* | (2016.01) |

(52) U.S. Cl.
CPC .......... *F03D 13/122* (2023.08); *F03D 13/135*
(2023.08); *F03D 80/501* (2023.08); *F03D
80/80* (2016.05); *F05B 2230/61* (2013.01);
*F05B 2240/95* (2013.01)

(56) References Cited

U.S. PATENT DOCUMENTS

| | | | | |
|---|---|---|---|---|
| 9,638,172 | B2 | 5/2017 | Nielsen | |
| 9,869,293 | B2 * | 1/2018 | Nielsen | F03D 80/88 |
| 10,107,267 | B2 * | 10/2018 | Hansen | F03D 80/82 |
| 10,683,847 | B2 | 6/2020 | Da Silva et al. | |
| 10,767,632 | B2 * | 9/2020 | Lynderup | F03D 80/82 |
| 10,907,614 | B2 * | 2/2021 | Thrue | E02D 27/52 |
| 11,286,915 | B2 * | 3/2022 | Soerensen | F03D 80/88 |
| 2012/0066998 | A1 * | 3/2012 | Tobinaga | F03D 9/25 |
| | | | | 52/651.01 |
| 2020/0040541 | A1 | 2/2020 | van der Tempel | |
| 2022/0099070 | A1 * | 3/2022 | Blaabjerg | E04G 3/24 |

FOREIGN PATENT DOCUMENTS

| | | | | |
|---|---|---|---|---|
| EP | 2 185 816 | 3/2009 | | |
| EP | 2746577 | A1 * 6/2014 | ............ | F03D 13/10 |
| EP | 3 222 848 | 9/2017 | | |
| EP | 3 438 449 | 2/2019 | | |
| EP | 3438449 | A1 * 2/2019 | ............ | F03D 1/065 |
| EP | 3 502 353 | 6/2019 | | |
| EP | 3 690 237 | 8/2020 | | |
| WO | WO 2014/094792 | 6/2014 | | |
| WO | WO 2015/144178 | 10/2015 | | |
| WO | WO 2018/046205 | 3/2018 | | |

* cited by examiner

INSTALLING EQUIPMENT IN OFFSHORE MONOPILE FOUNDATIONS

This invention relates to the challenges of installing and connecting equipment in offshore structures, especially those comprising monopile foundations as most commonly used in offshore wind turbines.

Offshore wind turbines require various items of on-board equipment to supply electrical power from a generator of the turbine to the grid. Such equipment may comprise several components and functional units required for operation of the wind turbine, such as switchgear, frequency converters, transformers and/or a controller, in addition to connections for cables that run between the seabed and the nacelle atop the mast or tower of the turbine.

At least part of the electrical equipment required by an offshore wind turbine may be pre-installed inside a foundation of the turbine, such as a monopile. Part of that equipment may also be located in the tower mounted atop the foundation. For example, U.S. Pat. No. 7,762,037 discloses equipment floors or platforms within a segment or section of a wind turbine tower.

In principle, much of the necessary equipment could be pre-installed in foundation or tower components of a wind turbine and transported within those components to an installation site. However, such equipment could be damaged by vibration, impact or moisture while the components are being transported and installed and so may require repair or replacement. This is a particular problem with monopile foundations, which are designed to be driven into the seabed under repeated impacts from a piledriver.

One approach to address this problem is to install a short, minimal foundation underwater and then to place an entire supporting structure with pre-installed electrical equipment and connections onto the foundation. This approach is appropriate for jackets or tripod supporting structures but not for monopiles.

WO 2018/046205 discloses a wind turbine whose tower is attached to an offshore support structure comprising a transition piece to connect the tower to a foundation, such as a jacket foundation, a gravity foundation or a monopile. The transition piece is attached to the foundation above the water level. The transition piece, which may be made of reinforced concrete, comprises a floor, walls and a roof defining an internal space that can house electrical equipment and that can be used by personnel to access the equipment and the interior of the tower. The transition piece supports, and is surmounted by, the tower. However, the use of a transition piece requires alignment with, and between, the mast and the monopile.

More generally, conventional transition pieces perform several functions, such as to provide: a work platform, which may comprise a service crane; a way of accessing the work platform, such as a ladder extending from a boat landing facility; an attachment interface, such as a flange, for mounting the tower; internal platforms for equipment; and a gas-tight deck for fixing cables.

In EP 3438449, a transition piece is a cylindrical extension of a monopile that contains pre-installed electrical equipment. Being bolted to a flange at the top of the monopile, it complicates the installation process.

Alternatively, electrical connection may be done only after installation of the monopile, for example by pulling cables with dedicated winches. In WO 2015/144178, electrical equipment is lifted inside the mast after installation. A power control module is placed on a temporary support device and a tower section is placed around the power control module. After connecting the power control module to the tower section, the connected power control module and tower section are removed from the temporary support device. The power control module hangs suspended in the tower section.

Monolithic wind turbines, with a monopile as long as possible, are preferred to reduce the size of the tower. There is a requirement for quick and easy manufacture and installation of electrical and electronic equipment and for that equipment to perform reliably over years of service offshore.

In this respect, the invention contemplates various improvements to the teaching of EP 3502353, which discloses a method of installing an electrical platform unit inside a monopile without recourse to a transition piece. The monopile of EP 3502353 comprises three interfaces, namely a flange for connecting a tower on top of the monopile, an internal support for the electrical platform unit, and another support for a work platform that surrounds the top of the monopile.

The electrical platform unit of EP 3502353 is challenging to lower into the monopile and to align correctly with the monopile. Structures protruding from the top of the electrical platform unit also hinder convenient lifting arrangements.

After installation of the electrical platform unit, EP 3502353 teaches that a protective cap has to be installed over the open top of the monopile to protect the electrical platform unit and its on-board equipment from the weather. Installing and removing the cap before mounting a tower to the monopile adds further procedural steps; also, when installed, the cap complicates access to the interior of the monopile.

EP 3502353 also contemplates that the work platform and the electrical platform unit must be installed in separate, successive steps before the tower is mounted on the monopile. The invention proposes other sequences and arrangements, not disclosed in EP 3502353, that simplify the procedure and the structure and that provide better support to the work platform and the electrical platform unit without complicating or compromising how the tower is mounted on the monopile.

Other known examples of components installed within a wind turbine are described in DE 102017010650, WO 2014/094792, US 2011/006538, EP 3690237 and US 2012/066998. Additionally, an example of a method of mounting an offshore tower onto a pile is described in US 2020/040541.

Against this background, the invention resides in a wind turbine equipment canister for supporting and enclosing electrical equipment or instrumentation of a wind turbine. The canister comprises: a housing defining or containing at least one internal platform for supporting the equipment; a lifting interface on a top of the housing; and at least one support formation positioned on or projecting laterally beyond a side wall of the housing, the support formation being capable of supporting the weight of the canister suspended therefrom when the canister is installed within a monopile foundation for a wind turbine.

To aid alignment and support, at least a portion of the side wall preferably tapers in diameter downwardly toward a base of the housing. For example, the side wall may comprise a cylindrical upper portion and a frusto-conical lower portion that tapers downwardly from the upper portion. The downwardly-tapering portion of the side wall can serve as a support formation. At least one vertically-oriented alignment formation may also be provided on the side wall to aid angular alignment of the canister.

For weatherproofing, at least the top of the housing may be substantially closed or may be penetrated by at least one opening that is closable by a hatch cover.

The support formation may be substantially level with the top of the housing, for example as a lateral extension of the top of the housing. Alternatively, the support formation could be at a level beneath the top of the housing.

The lifting interface suitably comprises posts upstanding from the top of the housing, the posts having a quick-release mechanism for engagement with a lifting frame.

The canister may be attached to a work platform that extends laterally beyond a diameter of the housing. For example, the canister could hang beneath or extend through the work platform.

The inventive concept also embraces a monopile foundation for a wind turbine, containing at least part of a canister of the invention. The housing of the canister, for example around a cylindrical upper portion, may conveniently be a sliding fit for longitudinal movement within an open top of the foundation.

The foundation may further comprise an internal support formation that is positioned to engage the support formation of the canister. Such an internal support formation may project inwardly from a surrounding wall of the foundation. An internal support formation of the foundation may define a support surface that is inclined inwardly and downwardly, for example to complement a downwardly-tapering portion of the canister.

For angular orientation, the foundation may comprise at least one internal guide formation that is configured for engagement with an abovementioned alignment formation of the canister. Such a guide formation may, for example, comprise downwardly-converging rails.

The canister could be recessed fully beneath a top end of the foundation. Alternatively, the support formation of the canister can rest upon a top interface of the foundation, such as a top flange, that is configured for mounting a tower upon the foundation. In that case, the support formation of the canister may be disposed inboard of an outer portion of the top interface, which outer portion is configured for mounting the tower upon the foundation.

The support formation of the canister could overlie an upper hang-off formation of an intermediate support structure, sleeve or insert that embraces the canister. For example, a lower part of the support structure may comprise an inwardly-facing support formation that complements the shape of the housing of the canister.

The inventive concept further embraces a wind turbine that comprises a tower mounted on a foundation of the invention, enclosing a canister of the invention.

Conveniently, the support formation of the canister can be sandwiched between mutually-opposed ends of the foundation and the tower. In that case, fastenings that join the tower to the foundation may extend through holes in the support formation of the canister.

The wind turbine may further comprise an external work platform, which may be supported by legs that are disposed externally around the foundation. Where the tower and the foundation are in mutual abutment, the tower and/or the foundation may extend through a wider opening that penetrates the work platform. Alternatively, the work platform may be sandwiched between mutually-opposed ends of the foundation and the tower. In that case, the work platform may be penetrated by an opening that is narrower than the mutually-opposed ends of the foundation and the tower. Fastenings, such as bolts, that join the tower to the foundation can extend through holes or bores in the work platform.

In some embodiments, the support formation of the canister may rest on a bottom interface of the tower, such as a bottom flange that is configured to mount the tower to the foundation.

The inventive concept extends to a wind turbine that comprises a monopile foundation and a tower mounted atop the foundation. The wind turbine further comprises: a canister disposed at least partially within the foundation and supporting and enclosing electrical equipment of the wind turbine; and/or an external work platform extending outside the foundation or the tower. A part of the canister and/or a part of the work platform is sandwiched between mutually-opposed ends of the foundation and the tower. Conveniently, fastenings that join the tower to the foundation may extend through holes in the sandwiched part of the canister and/or the work platform.

The inventive concept also extends to methods of assembling a wind turbine on a pre-installed monopile foundation. One such method comprises: lowering a canister into an open top of the foundation, the canister supporting and enclosing electrical equipment of the wind turbine; and mounting a tower on the foundation, sandwiching part of the canister between mutually-opposed ends of the foundation and the tower.

Another such method comprises: lowering an external work platform onto an open top of the foundation; and mounting a tower on the foundation, sandwiching part of the work platform between mutually-opposed ends of the foundation and the tower. That method may further comprise: preliminarily, lowering a canister into an open top of the foundation, the canister supporting and enclosing electrical equipment of the wind turbine; supporting the external work platform on the canister; and enclosing the canister when mounting the tower on the foundation. For example, the work platform and the canister could be lowered onto the foundation when they are already conjoined, or the work platform could be joined to the canister after the canister has been lowered into the foundation.

Another such method comprises: lowering a canister into an open top of the foundation, the canister supporting and enclosing electrical equipment of the wind turbine; and suspending at least part of the canister from a support formation of the foundation. That method may further comprise mounting a tower on the foundation in mutual end-to-end abutment, enclosing the canister. For example, the canister may be suspended from an inboard side of the support formation and the tower may be mounted on an outboard side of the support formation.

When being lowered, the canister may be slid down within the foundation. The canister may be oriented about horizontal and/or vertical axes in consequence of downward movement of the canister relative to the foundation. The canister could be seated into a support structure that is suspended from the support formation.

Another such method comprises: mounting at least a lower part of a tower on the foundation; and lowering a canister into the foundation through the tower, or the part of the tower, that is mounted on the foundation, the canister supporting and enclosing electrical equipment of the wind turbine. At least part of the canister may be suspended from a support formation of the tower, such as a bottom interface formation that is used for mounting the tower on the foundation.

In summary, monopiles without transition pieces are gaining acceptance as a low-cost solution for offshore wind turbine foundations. However, in view of pile-driving vibration especially, secondary structures attached to the pile, along with any mechanical or electrical outfitting, need to be retrofitted offshore. The key to successfully designing such foundations is to enable offshore retrofitting to be performed cost-effectively.

Embodiments of the invention envisage a substantially fully-enclosed canister that can be lifted into a monopile offshore and that provides a permanent housing for the electrical equipment and cable hang-offs that are required inside the monopile. Beneficially, the canister can be completed onshore in a factory set-up, including integration and commissioning of the equipment onboard, before being transported offshore.

It is envisaged that at least an outer shell of the canister could be made from a material such as fibre-reinforced plastics (FRP) or glass-reinforced plastics (GRP), although the shell could instead be made predominantly from steel or aluminium. FRP or GRP is lightweight, relatively low cost and weather-resistant. Also, FRP or GRP is suitable for series production using formwork, enabling the canister of the invention to be built locally in or near any of the countries that are active in the offshore wind industry globally.

In the embodiments to be described, the design of the canister provides an optimised shape to enable production-line fabrication techniques to be applied to the use of reinforced plastics or metals or combinations thereof, using moulds or jigs as appropriate. The optimised shape of the canister also enables self-guiding and location stability for loadout and installation, while ensuring that the canister is stable and self-supporting once lowered into a monopile.

The shell of the canister provides weather-resistant containment for the electrical equipment within, during: installation of the equipment in a manufacturing facility; transportation to site; installation; and in-place service.

The canister provides for hang-off of cables required for a wind turbine array, with sufficient space within the shell for efficient cable pull-in and connection to switchgear.

A simple seal arrangement can be provided at the top of the canister and monopile, with thermal isolation from cold-bridging to the monopile structure to minimise condensation.

Simplified configuration of rigging and installation avoids the need for large and complex installation aids.

The canister may be made in standardised shapes and sizes to enable use in monopiles of various designs and diameters across multiple projects.

A significant cost saving of the arrangement proposed by the invention is the elimination of a separate gas-tight deck that is conventionally required inside a monopile.

Thus, the invention provides electrical and instrumentation canisters for monopiles used in the offshore wind industry, and methods for their installation. The lightweight canister of the invention is easy to transport and install and could form a permanent housing for the mechanical and electrical outfitting required within a wind turbine monopile foundation. The canister has very low maintenance requirements. Thus, the invention enables low-cost installation and protection of the mechanical and electrical outfitting inside the monopile. In these and other ways, the invention improves existing monopile and transition piece designs known in the offshore wind industry.

Embodiments of the invention provide a canister for carrying equipment, such as electrical equipment, for a wind turbine. The canister comprises a housing that may be arranged to slide longitudinally within a monopile foundation and/or a tower of the wind turbine. The housing has at least one internal platform and a lifting interface. The top of the housing may be substantially closed.

The housing may have an upper section and a lower section. The upper section may be substantially cylindrical whereas the lower section may be frusto-conical or otherwise downwardly-tapering.

At least one of the top, the upper section and the lower section of the housing suitably comprises an interface for the canister to be supported by a complementary formation that is directly or indirectly connected to the monopile. For example, a transition between the upper and lower sections of the canister may serve as an interface or support formation.

The canister may comprise two or more floors or platforms connected by ladders, stairways and/or lift shafts, and may comprise chambers for electrical equipment within. The top of the housing may, for example, comprise a horizontal roof with at least one access hatch. More generally, the canister may further comprise at least one hatch for controlling access to the floors, platforms, ladders, stairways, lift shafts and/or chambers, and for sealing openings in the shell of the canister for weatherproofing. At least one such opening may be provided for electrical cables to enter or exit the canister.

A lifting interface may be mounted on the top of the canister, for example comprising padeyes or a mechanical quick-connector system such as that supplied under the registered trade mark 'Balltec LiftLOK'.

Embodiments of the invention also implement a method for installing at least one platform for electrical equipment inside a wind turbine. The method comprises: lifting a unit comprising the at least one platform, wherein the unit also comprises a support interface and a lifting interface, and may be a substantially closed container; installing the unit at least partially inside a monopile and/or a tower of the wind turbine; and optionally installing an external work platform around the monopile, for example around the top of the monopile.

Where an external work platform is installed around the top of the monopile, it may be installed before, during or after installing the unit. Thus, those steps may be reversed or combined. The method may further comprise mounting a tower on the monopile either directly or via the work platform, for example by bolting together flanges.

Distinct interfaces may be provided on the monopile for the unit, the work platform and the tower. Alternatively, the work platform may be connected to the top of the canister, before or after installing the canister, thus requiring interfaces on the monopile only for the tower and either the canister or the platform.

The work platform may be fixed to the monopile or the flange, for example by being sandwiched between the monopile and the tower and/or by being fixed to mounting formations on the outside or inside of the monopile.

The canister may be suspended from the work platform or the work platform may be supported via the canister.

The canister may be suspended from an interface situated at the top of the monopile, not necessarily recessed beneath the top of the monopile. In that case, an upper section of the canister may extend above the top of the monopile.

A support formation such as a flange on the monopile for mounting the tower may be adapted or extended also to support the canister.

An interface piece at the top of the monopile such as a support structure may provide support to the canister.

The canister could be supported by an interface inside the tower. Such an interface could be at or close to the bottom of the tower. For example, the interface could be defined by the top of a flange at the bottom of the tower that is also used to mount the tower to the monopile.

In order that the invention may be more readily understood, reference will now be made, by way of example, to the accompanying drawings in which.

Figures 1, 2:
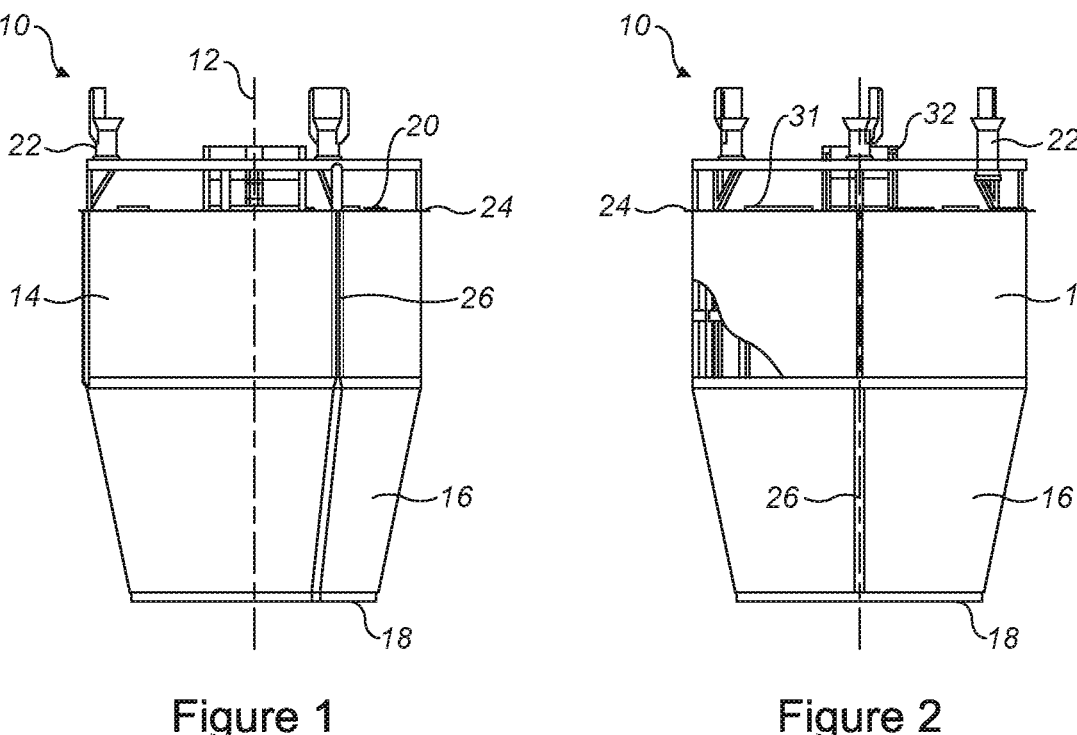
FIG. 1 is a side view of a canister of the invention.
FIG. 2 is a further side view of the canister of FIG. 1.
Figures 3, 4:
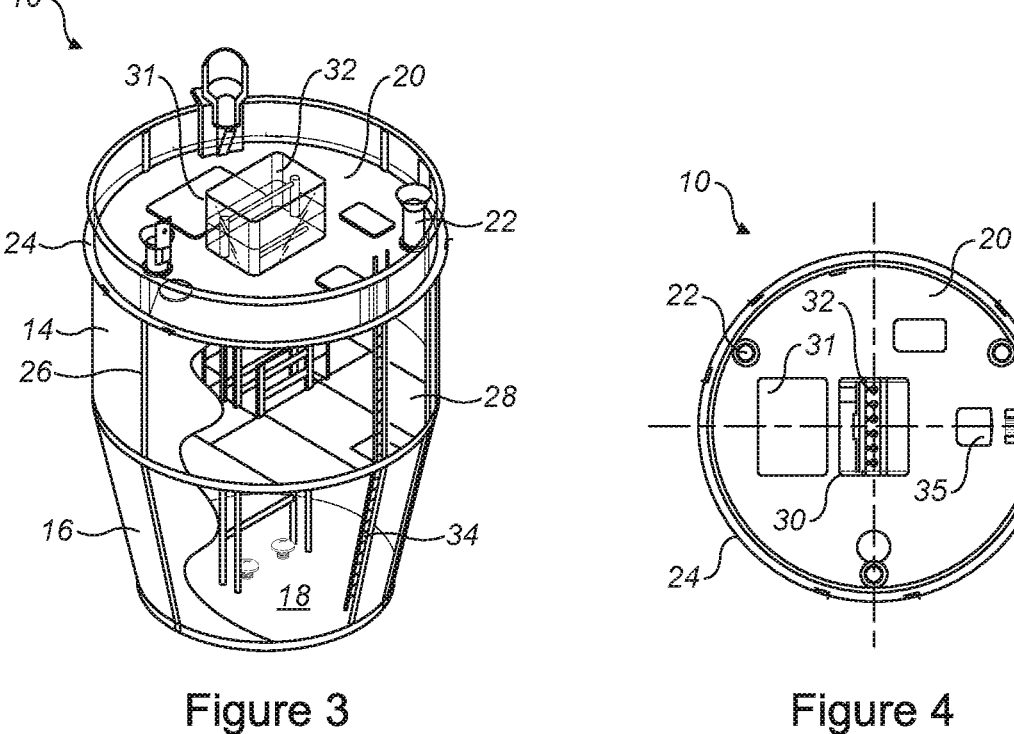
FIG. 3 is a perspective view of the canister of FIGS. 1 and 2, partially cut away to show its internal features.
FIG. 4 is a top plan view of the canister of FIGS. 1 to 3.

Referring firstly to FIGS. 1 to 4 of the drawings, a wind turbine equipment canister 10 of the invention comprises a hollow, substantially closed housing or shell whose side wall is rotationally symmetrical about a vertical central longitudinal axis 12. The side wall of the shell comprises a cylindrical upper portion 14 of substantially constant circular cross-section and a frusto-conical lower portion 16 that tapers downwardly from the diameter of the upper portion 14.

The shell is completed and closed at its bottom end by a flat circular base 18 and at its top end by a generally flat circular roof 20. The base 18 and the roof 20 lie in respective horizontal planes. The roof 20 is surmounted by a lifting interface that, in this example, comprises hollow vertical posts 22 equiangularly spaced about the central longitudinal axis 12. The canister 10 is stable when free-standing on its base 18.

A male hang-off formation projects outwardly in a horizontal direction from the upper portion of the side wall. In this example, the hang-off formation takes the form of a circumferential flange 24 surrounding the shell in alignment with the upper portion 14. The flange 24 is shown here at the level of the roof 20, for example as a horizontal extension of the roof 20.

The flange 24 need not be continuous as shown here but could be interrupted by one or more circumferential gaps. In other examples, a flange or other hang-off formation could be at a different vertical level along the canister 10, for example at the level of the lower portion 16 or at the interface between the upper and lower portions 14, 16. It would also be possible to support the canister 10 other than by a hang-off arrangement.

Elongate alignment formations 26 mounted externally on the side wall of the shell lie in respective vertical planes that also contain the central longitudinal axis 12. Those planes, and hence the alignment formations 26, are also equiangularly spaced about the central longitudinal axis 12.

On its upper side within the shell, the base 18 defines a lower equipment platform or deck of the canister 10. A parallel upper equipment platform or deck 28 extends across the canister 10 at the junction between the upper and lower portions 14, 16 of the shell. The base 18 and the upper equipment deck 28 support items of equipment (not shown) that are required for operation of the wind turbine, such as switchgear, a transformer, a converter and/or control equipment. When the canister 10 is installed in a wind turbine, cables from outside the canister 10 can be connected to that equipment to convey power and data signals within, into and out of the wind turbine as required. The roof 20 may, of course, also serve as an equipment deck after the canister 10 has been installed.

The roof 20 is penetrated by a central opening 30 that communicates with the interior of the shell. The opening 30 can be closed by a hatch cover 31 shown here beside the opening, hence weatherproofing the roof 20 and substantially sealing the shell of the canister 10. When the hatch cover is open as shown, a frame 32 within the shell may extend upwardly from the base 18 and through the upper equipment deck 28 to protrude above the roof 20 through the central opening 30. The frame 32 may, for example, support cables that extend into the tower of the completed wind turbine structure and/or may serve as the base of a lift shaft also extending into the tower. At its lower end, the frame 32 may extend to cable hang-off provisions mounted on the base 18 for supporting cables that, in use, hang down toward the seabed into the foundation beneath the canister 10.

An internal ladder 34 provides alternative access between the base 18, the upper equipment deck 28 and the roof 20 of the canister 10. Again, a hatch cover 35 may close the opening that accommodates the ladder 34.

Moving on now to FIGS. 5, 6 and 7a to 7c, these drawings shows the canister 10 in its context of use, in which the canister 10 is supported above sea level in the monopile foundation of a wind turbine.

Figure 5:
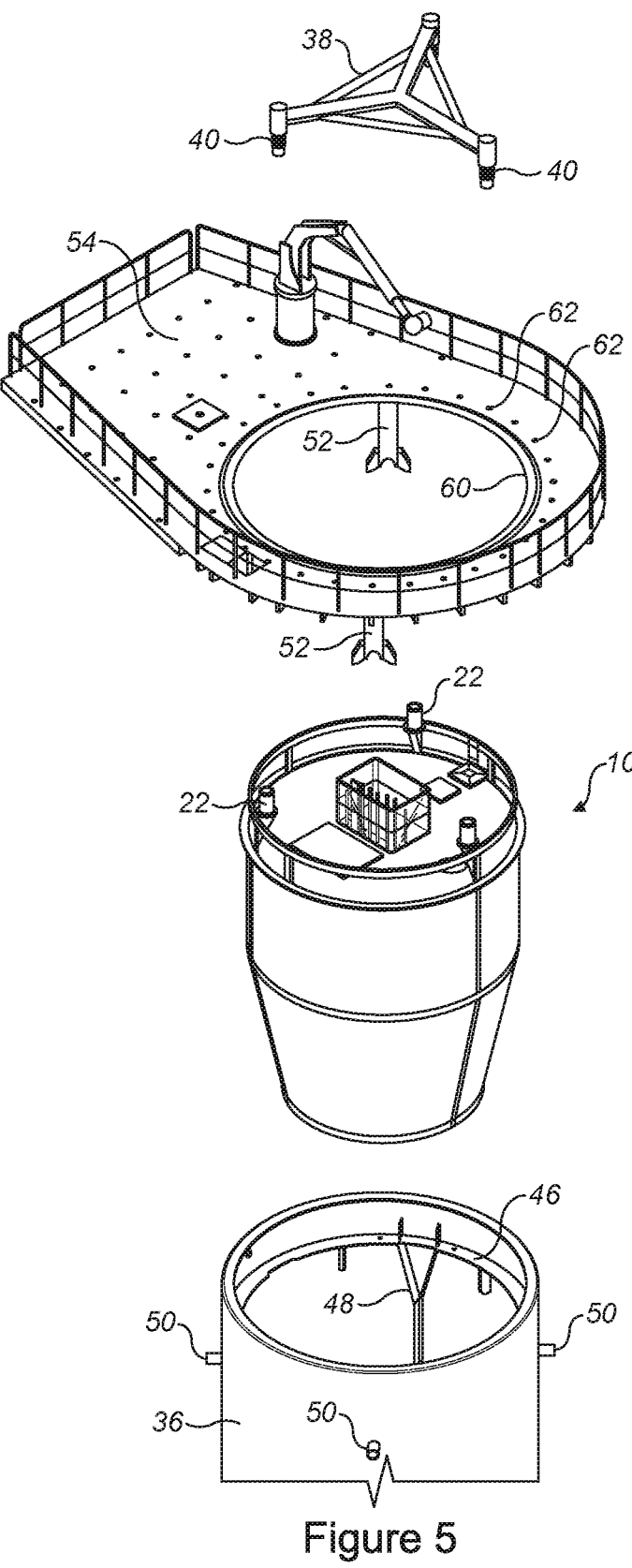
FIG. 5 is an exploded perspective view showing the canister of FIGS. 1 to 4 in conjunction with the top of a monopile foundation, a work platform and a lifting frame that is cooperable with a lifting interface on top of the canister.
Figures 7A, 7B, 7C:
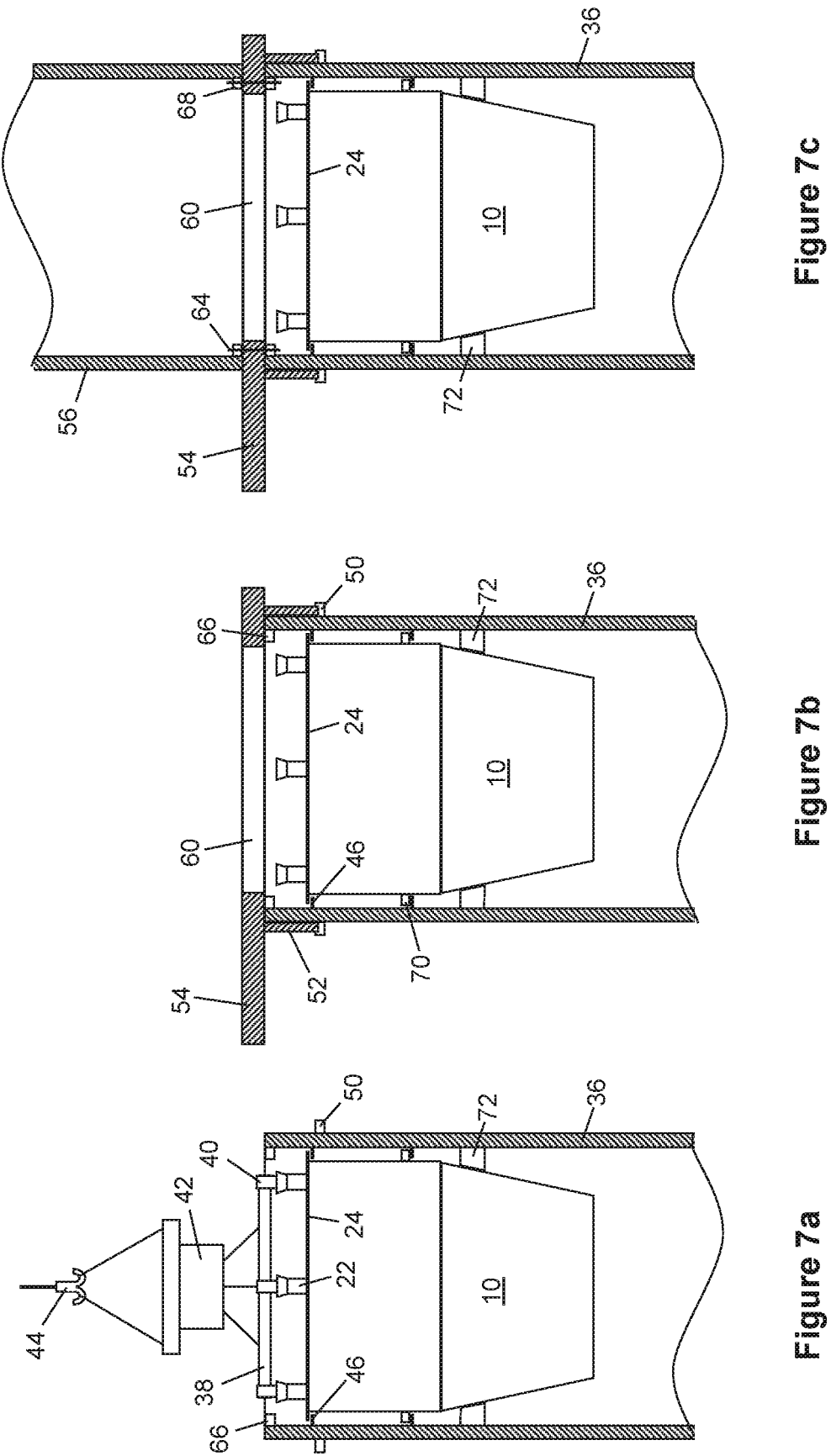
FIGS. 7a to 7c are a sequence of schematic sectional side views showing a first embodiment and method of the invention for assembling a canister with a monopile foundation and a work platform.

In the exploded view of FIG. 5, the canister 10 is shown in coaxial alignment with the open top of a pre-installed foundation in the form of a tubular monopile 36 that receives the canister 10 telescopically as the canister 10 is lowered by a crane. In effect, the canister 10 is installed as a cartridge into a socket within the open top of the monopile 36. FIG. 7a also shows the canister 10 when lowered into position within the monopile 36.

For the purpose of lifting and lowering the canister 10, FIGS. 5 and 7a show a lifting frame 38 that can be engaged from above with the lifting interface of the canister 10. Specifically, the lifting frame 38 comprises vertical pins 40 that are positioned to engage within respective ones of the upstanding tubular posts 22 on the roof 20 of the canister 10. A mechanical quick-connector system such as the aforementioned Balltech LiftLOK may act between the pins 40 and the posts 22 to engage and disengage the lifting frame 38.

FIG. 7a also shows a load orientation system 42 that may be interposed between the lifting frame 38 and the hook 44 of a crane to control the orientation of the canister 10 about a vertical axis.

The monopile 36 has a female hang-off formation that forms part of a first interface of the monopile 36, namely that between the monopile 36 and the canister 10. The female hang-off formation is exemplified here by an inner circumferential flange 46 that is cooperable with the corresponding flange 24 of the canister 10 to support the weight of the canister 10. The inner flange 46 lies in a horizontal plane that is spaced sufficiently beneath the top of the monopile 36 as to recess the top of the canister 10 at a level beneath the horizontal plane of the upper end of the monopile 36.

Conveniently, cooperation between the flange 24 of the canister 10 and the flange 46 of the monopile 36 effects or enables a seal. That seal protects the interior of the monopile 36 and the portion of the canister 10 beneath the flange 46 from the weather once the canister 10 has been installed. The roof 20 of the canister 10 may also be weatherproofed, for example with hatch covers 31, 35 as noted above. This means that a temporary cap over the open top of the monopile 36 is not essential to protect the equipment within the canister 10 from the weather, hence simplifying the wind turbine installation process.

FIG. 5 shows downwardly-converging Y-shaped alignment rails 48 that are angularly spaced around the interior of the monopile 36. Each of the alignment rails 48 serves as a guide formation, being positioned to receive a respective one of the alignment formations 26 of the canister 10 and to guide the canister 10 into correct angular alignment with the monopile 36 as the canister 10 is lowered into the open top of the monopile 36. Once seated into the monopile 36 in the correct angular alignment, the canister 10 may be held down by anti-lift fixings acting between the cooperating circumferential flanges 24, 46 of the canister 10 and the monopile 36.

Figure 6:
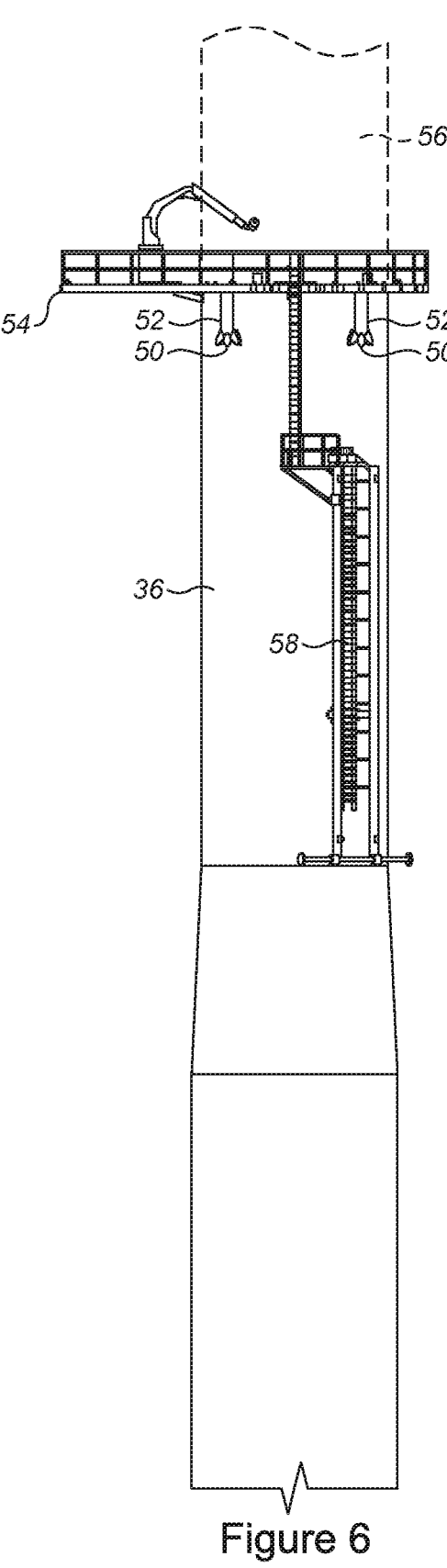
FIG. 6 is a side view of the monopile foundation shown in FIG. 5 supporting the work platform also shown in FIG. 5 and containing the canister of FIGS. 1 to 4.

Externally, the monopile 36 is encircled by an angularly-spaced array of outwardly-projecting studs 50 that lie in a horizontal plane spaced beneath the top of the monopile 36. The studs 50 align with, and support, respective legs 52 of a work platform 54 that is also shown in FIGS. 5, 6, 7b and 7c. Thus, the studs 50 and the legs 52 together define a second interface of the monopile 36, namely that between the monopile 36 and the work platform 54. Specifically, the legs 52 hang from the work platform 54 and lie against the exterior of the monopile 36 to engage the studs 50. That engagement between the legs 52 and the studs 50 fixes the work platform 54 relative to the monopile 36 as shown in FIG. 7b before a tubular tower 56 is mounted on the monopile 36 as shown in FIGS. 6 and 7c.

FIG. 6 also shows a ladder arrangement 58 beneath and connecting to the work platform 54 that provides for docking a service vessel to the wind turbine and for access of personnel to the wind turbine via the work platform 54.

FIG. 5 shows that a circular opening 60 penetrates the work platform 54 in coaxial alignment with the top of the monopile 36. In this example, the work platform 54 is asymmetric in plan view, having a major portion laterally offset to one side of the opening 60.

In this example, the opening 60 in the work platform 54 has an inner diameter that is slightly smaller than the outer diameter of the top of the monopile 36. The opening 60 is surrounded by a circular array of holes 62 that together receive a corresponding array of pins or bolts 64 projecting vertically from a flange 66 at the top of the monopile 36 and into a complementary flange 68 at the bottom of the tower 56 as shown in FIG. 7c.

The bolts 64 and flanges 66, 68 form part of a third interface of the monopile 36, namely that between the monopile 36 and the tower 56 that surmounts the monopile 36. It will be apparent that the peripheral region of the work platform 54 immediately surrounding the opening 60 is sandwiched and indeed clamped between the monopile 36 and the tower 56, thereby further locating the work platform 54 relative to the monopile 36.

FIGS. 7a to 7c show further provisions for defining the first interface between the monopile 36 and the canister 10. These provisions may be additional to, or instead of, the cooperating flanges 24, 46 at or near the top of the canister 10. They comprise additional cooperating flanges 70 at a lower position on the upper portion 14 of the side wall, and wedge-faced supports 72 extending inwardly from the side wall of the monopile 36 in opposition to the lower portion 16 of the side wall. The wedge faces of the supports 72 engage, and complement the inclination and curvature of, the frusto-conical lower portion 16 of the side wall. The supports 72 could be discrete structures angularly-spaced around the central longitudinal axis 12 of the canister 10 or could be parts of a circumferentially-continuous ring that encircles the interior of the monopile 36.

The flanges 24, 46, the additional flanges 70 and the supports 72 may be used individually or in any combination. In the remaining drawings, the flanges 70 are omitted for simplicity but the supports 72 are retained or replaced with equivalent features.

FIGS. 8a to 12c show various other arrangements and methods of the invention for assembling a wind turbine that incorporates a canister 10 of the invention. Like numerals are used for like features.

Figures 8A, 8B, 8C:
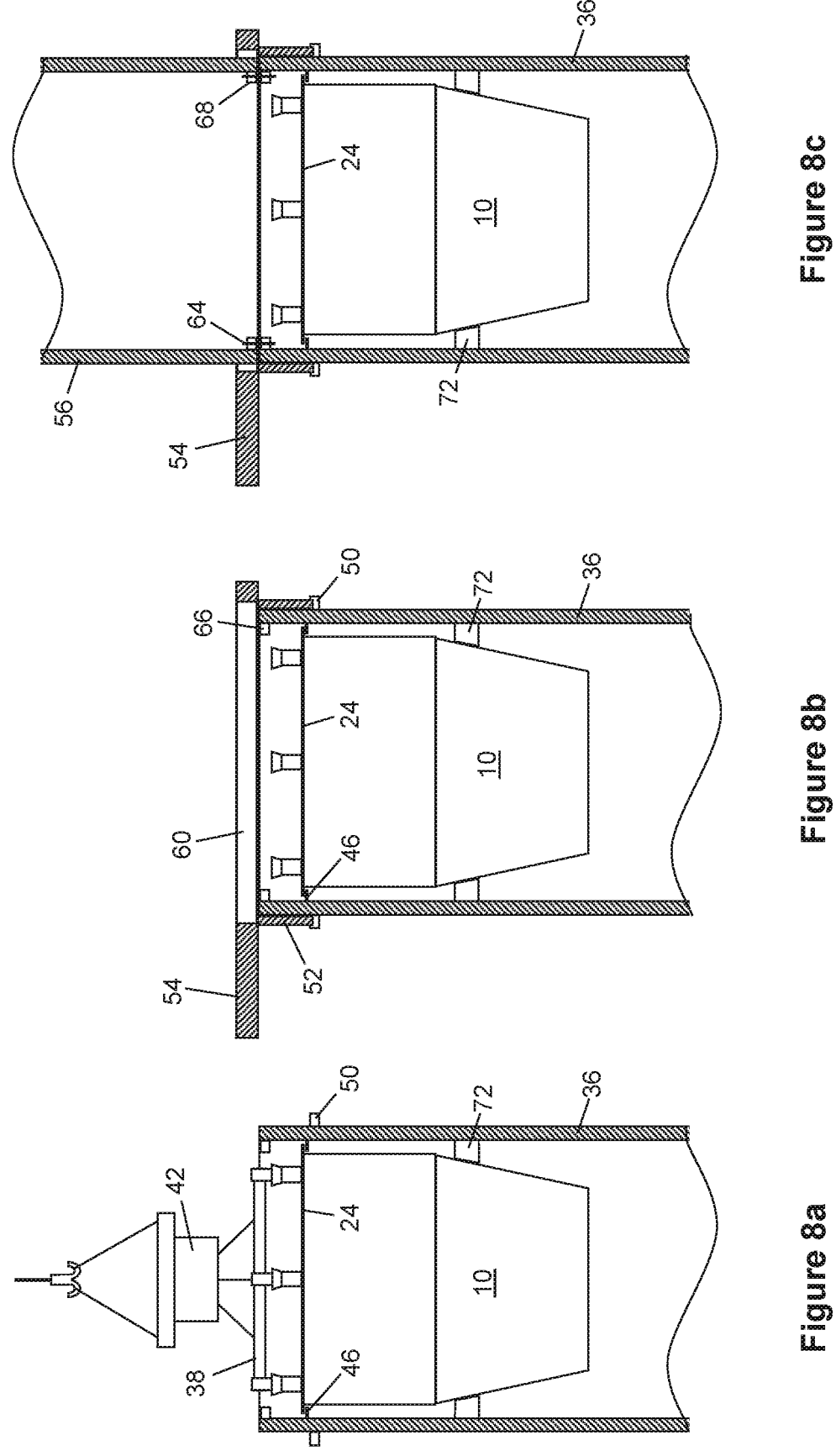
FIGS. 8a to 8c are a sequence of schematic sectional side views showing a second embodiment and method of the invention for assembling a canister with a monopile foundation and a work platform.

The arrangement and method steps shown in FIGS. 8a to 8c correspond to those of FIGS. 7a to 7c except that the circular opening 60 in the work platform 54 is wider than the outer diameter of both the monopile 36 and the tower 56. Consequently, the monopile 36 and/or the tower 56 can extend through opening 60 and hence through the work platform 54 to abut directly at their mutual interface, where the bolts 64 extend through the abutting flanges 66, 68. In this arrangement, unlike that of FIGS. 7a to 7c, the work platform 54 is not clamped between monopile 36 and the tower 56 but instead relies upon engagement of the legs 52 under the work platform 54 with the studs 50 on the exterior of the monopile 36.

Figure 9B:
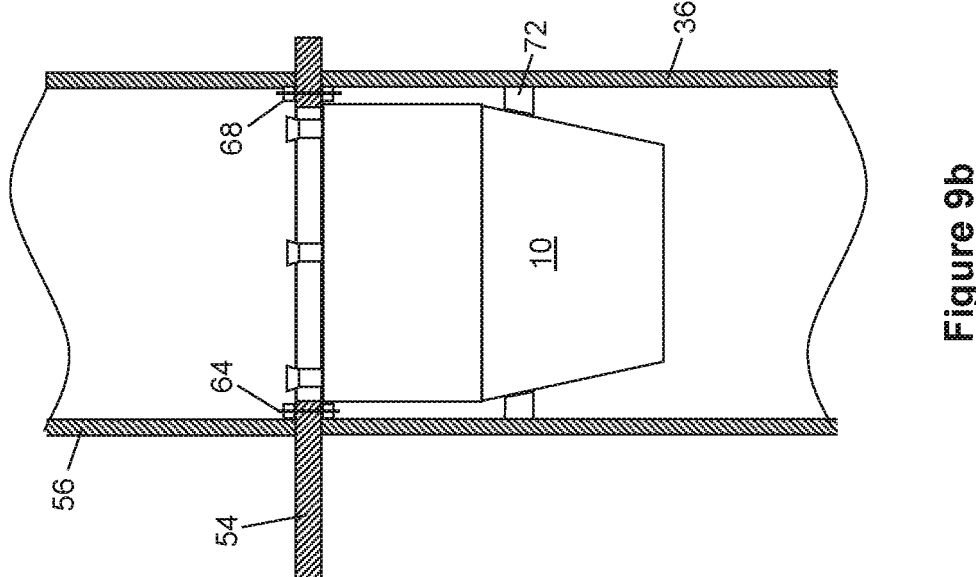
FIGS. 9a and 9b are schematic sectional side views showing a third embodiment and method of the invention for assembling a canister with a monopile foundation and a work platform.
Figure 9A:
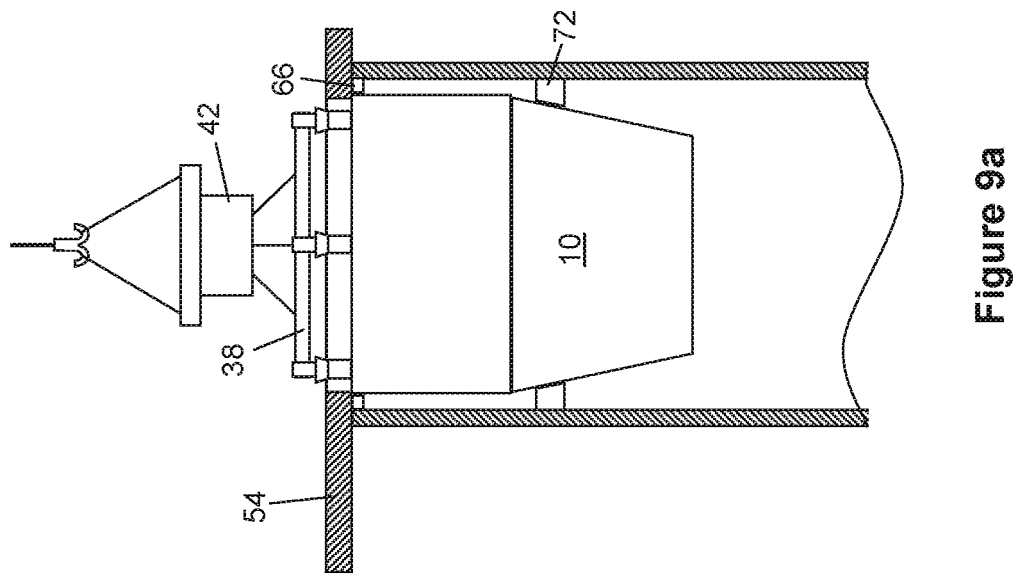

FIGS. 9a and 9b show a variant of the invention in which the work platform 54 is attached directly to the canister 10 before or after the canister 10 is installed in the monopile 36. In the former case, the work platform 54 and the canister 10 are installed together on the monopile 36, being lifted together as an assembly by a lifting frame 38 as shown in FIG. 9a. For example, the canister 10 could be pre-inserted into the opening 60 in the work platform.

In the example shown in FIGS. 9a and 9b, the work platform 54 is clamped between the monopile 36 and the tower 56 in a manner similar to that shown in FIG. 7c. In other words, the bolts 64 extend through the flanges 66, 68 and through the platform 54 sandwiched between the flanges 66, 68. In view of this, and as the work platform 54 can also rely upon its attachment to the canister 10 for support, legs 52 under the work platform 54 engaging with studs 50 on the monopile 36 are optional and have been omitted from these drawings. However, a second interface such as that defined by the studs 50 and the legs 52 could be provided, for example in an alternative arrangement in which the opening 60 of the work platform 54 is wide enough for the monopile 36 and the tower 56 to abut directly at their mutual interface in a manner akin to that shown in FIG. 8c.

Figures 10A, 10B, 10C:
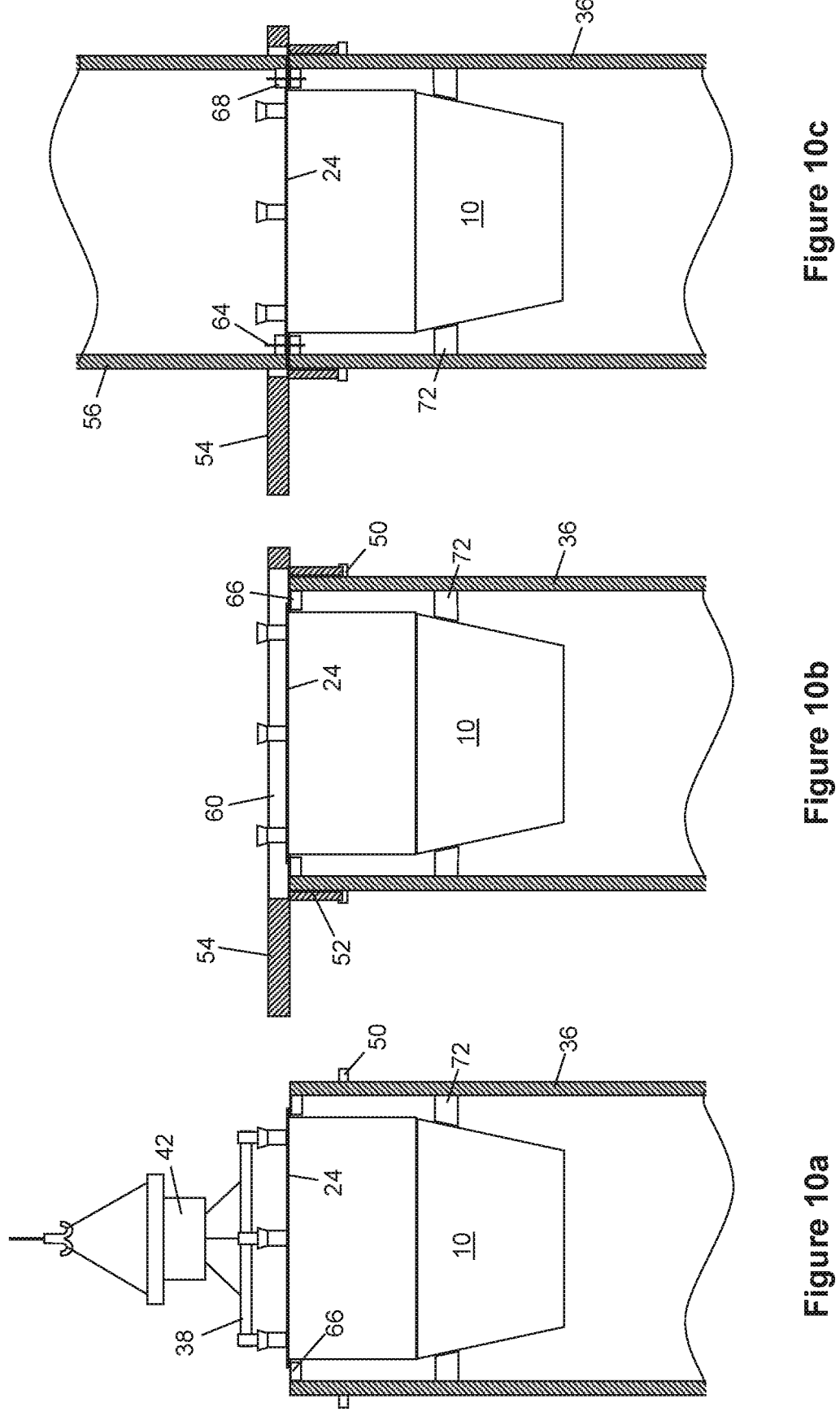
FIGS. 10a to 10c are a sequence of schematic sectional side views showing a fourth embodiment and method of the invention for assembling a canister with a monopile foundation and a work platform.

FIGS. 10a to 10c show an arrangement of the invention in which the top of the canister 10 is not recessed below the top of the monopile 36 but instead projects above the top of the monopile 36. In this example, the flange 24 of the canister 10 lies on an inwardly-projecting flange 66 that is positioned at or near to the top of the monopile 36.

The arrangement is such that at least part of the canister 10, in this case the posts 22 of the lifting interface, extends above the top of the monopile 36. Thus, this upwardly-projecting part of the canister 10 lies within the base of the tower 56 as shown in FIG. 10c.

In FIGS. 10b and 10c, the work platform 54 is supported, optionally, by legs 52 under the work platform 54 engaged with studs 50 on the monopile 36. Also, the opening 60 of the work platform 54 is wide enough for the monopile 36 and the tower 56 to abut directly at their mutual interface in a manner akin to that shown in FIG. 8c. However, with a narrower opening 60, it would instead be possible for the work platform 54 to be clamped between the monopile 36 and the tower 56 like the arrangement of FIGS. 7c and 9b. In either case, the flange 24 of the canister 10 could be clamped between the flanges 66, 68 of the monopile 36 and the tower 56, or between one of the flanges 66, 68 and the work platform 54. Also, the bolts 64 that extend through the flanges 66, 68 of the monopile 36 and the tower 56 could, in principle, also extend through the flange 24 of the canister 10.

Figures 11A, 11B, 11C:
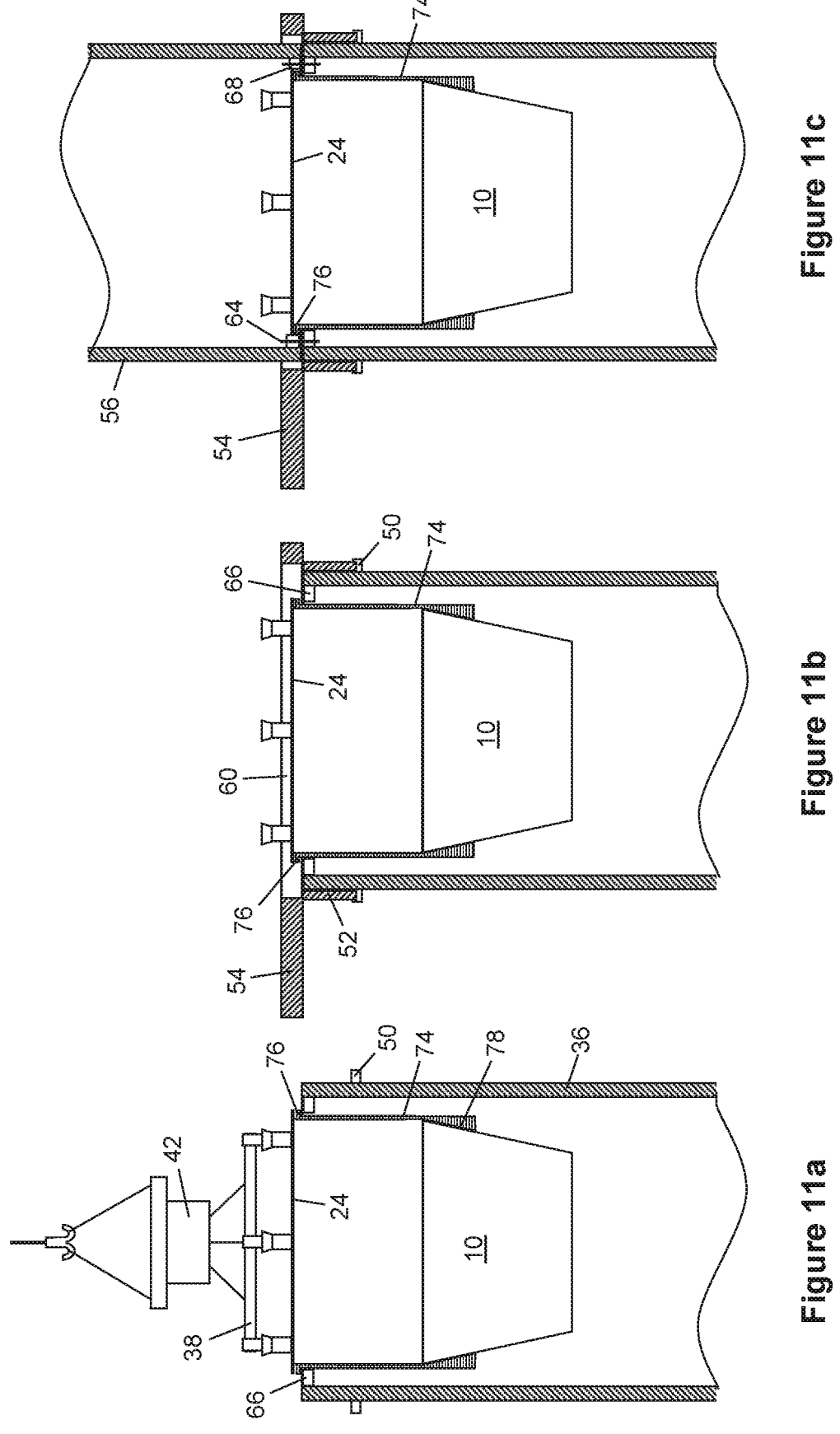
FIGS. 11a to 11c are a sequence of schematic sectional side views showing a fifth embodiment and method of the invention for assembling a canister with a monopile foundation and a work platform.

The arrangement of the invention shown in FIGS. 11a to 11c corresponds to that shown in FIGS. 10a to 10c except that an intermediate support structure 74 hangs from the inwardly-projecting flange 46 of the monopile 36. The support structure 74 has a hang-off flange 76 at its upper end that lies on the flange 66 of the monopile 36. The flange 24 of the canister 10 lies on the hang-off flange 76 of the support structure 74 and so is also supported by the underlying flange 66 of the monopile 36.

The support structure 74 also an inwardly-facing frusto-conical surface 78 at its lower end that complements, receives and supports the lower portion 16 of the side wall of the canister 10. That frusto-conical surface 78 replaces the supports 72 of the preceding embodiments, which are therefore omitted from FIGS. 11a to 11c.

The variants mentioned in relation to the arrangement of FIGS. 10a to 10c could also be applied to the arrangement of FIGS. 11a to 11c. Analogously, the hang-off flange 76 of the support structure 74 could be clamped directly or indirectly between the flanges 66, 68 of the monopile 36 and the tower 56. Similarly, the bolts 64 that extend through those flanges 66, 68 of the monopile 36 and the tower 56 could extend through the hang-off flange 76. However, in the arrangement shown in FIG. 11c, the hang-off flange 76 is inboard of the inwardly-projecting flange 68 at the base of the tower 56.

The complementary flange 66 at the top of the monopile 36 is extended in a radially inward direction to accommodate the combined width of the concentric flanges 62, 76.

Figures 12A, 12B, 12C:
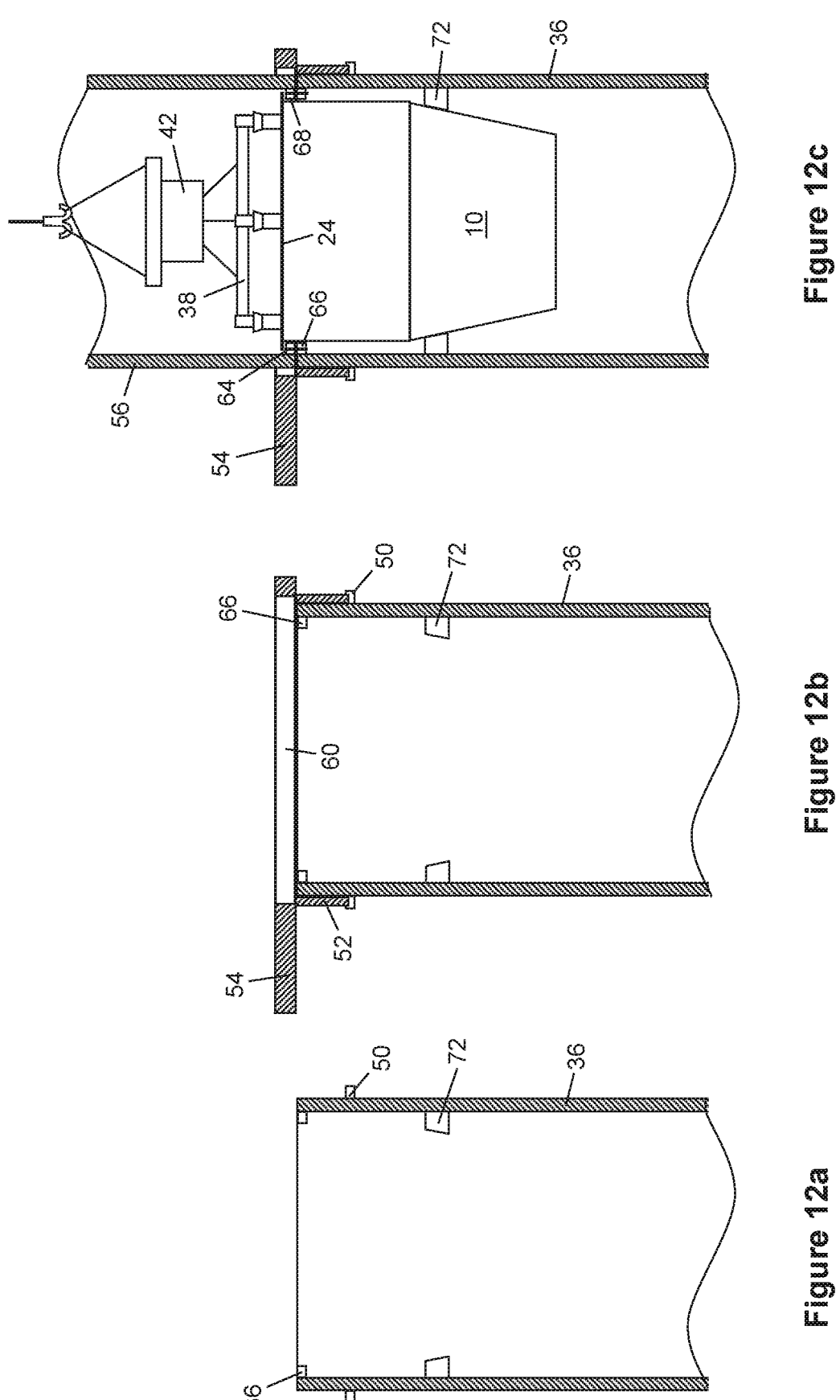
FIGS. 12a to 12c are a sequence of schematic sectional side views showing a sixth embodiment and method of the invention for assembling a canister with a monopile foundation and a work platform.

Turning finally to FIGS. 12a to 12c, these drawings show a further arrangement of the invention in which the canister 10 is lowered into the monopile 36 only after mounting the tower 56 to the monopile 36 as shown in FIG. 12c. This arrangement is apt to be used where the tower 56 comprises stacked sections affixed end-to-end, meaning that the canister 10 does not have to be lifted to and lowered from the full height of the tower 56 but only to and from the height of its lowest section.

In the example shown in FIG. 12c, the flange 24 of the canister 10 rests upon an inwardly-projecting flange 68 within the tower 56, for example at the base of the tower 56 as shown. The major portion of the canister 10 beneath the flange 68 hangs into the open top of the monopile 36, where optional supports 72 cradle the lower portion 16 of the side wall of the canister 10.

Again, the work platform 54 shown in FIGS. 12b and 12c is supported, optionally, by legs 52 under the work platform 54 engaged with studs 50 on the monopile 36. Also, the opening 60 of the work platform 54 is wide enough for the monopile 36 and the tower 56 to abut directly at their mutual interface in a manner akin to that shown in FIGS. 8c, 10c and 11c. However, with a narrower opening 60, it would instead be possible for the work platform 54 to be clamped between the monopile 36 and the tower 56 like the arrangement of FIGS. 7c and 9b. In either case, the bolts 64 that extend through the flanges 66, 68 of the monopile 36 and the tower 56 could, in principle, also extend through the flange 24 of the canister 10.

The invention claimed is:

1. A wind turbine equipment canister for supporting and enclosing electrical equipment of a wind turbine, the canister comprising:
   a housing comprising a side wall, a base and a roof, the housing containing at least one internal platform for supporting the equipment within the housing;
   a lifting interface on the roof of the housing;
   wherein the side wall of the housing comprises a cylindrical upper portion and a frusto-conical lower portion that tapers in diameter downwardly from the upper portion toward the base of the housing, and
   wherein the frusto-conical lower portion of the side wall of the housing has an inclination and curvature that is configured to complement and engage with inclined wedge faces of wedge-faced supports extending inwardly from a side wall of a monopile foundation for the wind turbine, such that the frusto-conical lower portion of the side wall of the housing serves as a support formation to support a weight of the canister when the canister is installed within the monopile foundation.

2. The canister of claim 1, further comprising at least one vertically oriented alignment formation on the side wall of the housing.

3. The canister of claim 1, wherein the roof of the housing is closed, or is penetrated by at least one opening that is closable by a hatch cover.

4. The canister of claim 1, further comprising a circumferential flange support formation projecting laterally beyond the side wall of the housing and being level with the roof of the housing.

5. The canister of claim 4, wherein the circumferential flange support formation is a lateral extension of the roof of the housing.

6. The canister of claim 1, wherein the circumferential flange support formation projects laterally beyond the side wall of the housing at a location beneath the roof of the housing.

7. The canister of claim 1, wherein the lifting interface comprises posts upstanding from the top of the housing, the posts having a quick release mechanism for engagement with a lifting frame.

8. A system comprising the canister of claim 1 and a work platform, wherein the canister is attached to the work platform, and the work platform is configured to extend laterally beyond a diameter of the housing of the canister.

9. The system of claim 8, wherein the canister is arranged to hang beneath or extend through the work platform.

10. The monopile foundation for a wind turbine, comprising the canister of claim 1, wherein at least a part of the canister is contained within the monopile foundation.

11. The monopile foundation of claim 10, wherein the housing is a sliding fit for longitudinal movement within an open top of the monopile foundation.

12. The monopile foundation of claim 10, further comprising an internal support formation that is positioned to engage the support formation of the canister.

13. The monopile foundation of claim 12, wherein the internal support formation projects inwardly from a surrounding wall of the monopile foundation.

14. The monopile foundation of claim 12, wherein the internal support formation defines a support surface that is inclined inwardly and downwardly.

15. The monopile foundation of claim 10, wherein the canister further comprises at least one alignment formation and the monopile foundation comprises at least one internal guide formation that is configured for engagement with the alignment formation.

16. The monopile foundation of claim 15, wherein the guide formation comprises downwardly converging rails.

17. The monopile foundation of claim 10, wherein the canister is recessed fully beneath a top end of the monopile foundation.

18. The monopile foundation of claim 10, wherein the support formation of the canister rests upon a top interface of the monopile foundation that is configured for mounting a tower upon the monopile foundation.

19. The monopile foundation of claim 18, wherein the support formation of the canister is disposed inboard of an outer portion of the top interface, which outer portion is configured for mounting the tower upon the monopile foundation.

20. The monopile foundation of claim 10, wherein the support formation of the canister overlies an upper hang off formation of a support structure that embraces the canister.

21. The monopile foundation of claim 20, wherein a lower part of the support structure comprises an inwardly facing support formation that complements the housing of the canister.

22. A wind turbine comprising a tower and the monopile foundation of claim 10, wherein the tower is mounted on the foundation and encloses the canister.

23. The wind turbine of claim 22, wherein the support formation of the canister is sandwiched between mutually opposed ends of the monopile foundation and the tower.

24. The wind turbine of claim 23, wherein fastenings that join the tower to the monopile foundation extend through holes in the support formation of the canister.

25. The wind turbine of claim 22, further comprising an external work platform.

26. The wind turbine of claim 25, wherein the tower and the monopile foundation are in mutual abutment.

27. The wind turbine of claim 26, wherein the tower and/or the monopile foundation extend through a wider opening that penetrates the work platform.

28. The wind turbine of claim 26, wherein the work platform is sandwiched between mutually opposed ends of the monopile foundation and the tower.

29. The wind turbine of claim 28, wherein the work platform is penetrated by an opening that is narrower than the mutually opposed ends of the monopile foundation and the tower.

30. The wind turbine of claim 28, wherein fastenings that join the tower to the monopile foundation extend through holes in the work platform.

31. The wind turbine of claim 25, wherein the work platform is supported by legs that are disposed externally around the monopile foundation.

32. The wind turbine of claim 22, wherein the support formation of the canister rests on a bottom interface of the tower, which interface is configured to mount the tower to the monopile foundation.

* * * * *